(12) United States Patent
Fulcher et al.

(10) Patent No.: US 8,988,369 B1
(45) Date of Patent: Mar. 24, 2015

(54) RESTRICTED CAROUSEL WITH BUILT-IN GESTURE CUSTOMIZATION

(75) Inventors: Richard Fulcher, Sunnyvale, CA (US); Gabriel Cohen, Alameda, CA (US); Paul Westbrook, San Jose, CA (US); Andrew Flynn, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,911

(22) Filed: Sep. 29, 2011

Related U.S. Application Data

(63) Continuation of application No. 13/029,813, filed on Feb. 17, 2011, now Pat. No. 8,610,682.

(51) Int. Cl.
*G06F 3/041* (2006.01)
*G06F 17/30* (2006.01)

(52) U.S. Cl.
CPC .................................. *G06F 17/3028* (2013.01)
USPC ........... 345/173; 345/156; 345/174; 345/175; 345/157; 715/700; 715/863; 715/702; 455/556.1

(58) Field of Classification Search
USPC .................................. 345/170–173; 715/700
See application file for complete search history.

(56) References Cited

U.S. PATENT DOCUMENTS

| | | | |
|---|---|---|---|
| 6,249,606 B1 * | 6/2001 | Kiraly et al. .................. | 382/195 |
| 7,180,500 B2 * | 2/2007 | Marvit et al. ................. | 345/156 |
| 7,180,501 B2 * | 2/2007 | Marvit et al. ................. | 345/156 |
| 7,558,600 B2 * | 7/2009 | Kang .......................... | 455/556.1 |
| 7,831,934 B2 * | 11/2010 | Davis et al. ................... | 715/863 |
| 7,895,537 B2 * | 2/2011 | Gruen et al. .................. | 715/863 |
| 2002/0115476 A1 * | 8/2002 | Padawer et al. ............... | 455/564 |
| 2007/0177803 A1 * | 8/2007 | Elias et al. .................... | 382/188 |
| 2008/0104547 A1 * | 5/2008 | Morita et al. ................. | 715/863 |
| 2009/0058823 A1 | 3/2009 | Kocienda | |
| 2009/0228807 A1 * | 9/2009 | Lemay ......................... | 715/752 |
| 2010/0031202 A1 | 2/2010 | Morris et al. | |
| 2010/0083190 A1 * | 4/2010 | Roberts et al. ................ | 715/863 |
| 2010/0205563 A1 | 8/2010 | Haapsaari et al. | |
| 2010/0328224 A1 | 12/2010 | Kerr et al. | |
| 2011/0081889 A1 | 4/2011 | Gao et al. | |
| 2011/0113384 A1 | 5/2011 | Gotcher et al. | |
| 2011/0279384 A1 * | 11/2011 | Miller et al. .................. | 345/173 |

OTHER PUBLICATIONS

Office Action mailed Nov. 21, 2011, in U.S. Appl. No. 13/250,079, Mendis, C., filed Sep. 30, 2011.

* cited by examiner

*Primary Examiner* — Grant Sitta
(74) *Attorney, Agent, or Firm* — Troutman Sanders LLP; James E. Schutz; Christopher W. Glass

(57) ABSTRACT

A method, computer program product, and system are provided for defining a touch gesture on a touch sensing device. The method can include receiving a touch gesture at the touch sensing device, determining that the touch gesture is not associated with any operations, and providing an indication of one or more operations the touch sensing device can perform in response to the touch gesture. The method can also include receiving a selection of an operation, and associating the touch gesture with the selected operation.

12 Claims, 5 Drawing Sheets

RESTRICTED CAROUSEL WITH BUILT-IN GESTURE CUSTOMIZATION

CROSS REFERENCE TO RELATED APPLICATIONS

The present application is a continuation of U.S. application Ser. No. 13/029,813 filed Feb. 17, 2011, which is incorporated herein by reference in its entirety.

BACKGROUND

Touchscreen displays play a prominent role in the design of many electronic devices such as, for example, personal digital assistants (PDAs), satellite navigation devices, and mobile devices. Touchscreen displays can detect the presence and location of a touch command (e.g., by one or more fingers) within a display area. In turn, the presence and location of the touch command can be processed by the electronic device to allow a user to have the ability to interact with what is shown on the touchscreen display.

Among other benefits, touchscreen displays and associated touch gestures (also referred to herein as "commands") recognized by electronic devices incorporating the touchscreen displays allow users to execute software functions (e.g., zoom in/out of a software map application) using, for example, a finger gesture (e.g., long-press finger gesture or a finger flick gesture). As software applications become more sophisticated in nature, additional gestures can be used to execute new functions associated with the applications.

Methods and systems are needed to enable additional operations on a touchscreen display using a gesture command.

SUMMARY

Embodiments include a method for defining a touch gesture on a touch sensing device. The method includes receiving a touch gesture at the touch sensing device, determining that the touch gesture is not associated with any operations, and providing an indication of one or more operations the touch sensing device can perform in response to the touch gesture. The method can further include receiving a selection of an operation, and associating the touch gesture with the selected operation.

Embodiments additionally include a computer program product that includes a computer-usable medium with computer program logic recorded thereon for enabling a processor to execute an operation associated with a touch gesture on a touch sensing device. The computer program logic includes the following: first computer readable program code that enables a processor to receive a touch gesture at the touch sensing device; second computer readable program code that enables a processor to determine that the touch gesture is not associated with any operations; third computer readable program code that enables a processor to provide an indication of one or more operations the touch sensing device can perform in response to the touch gesture; fourth computer readable program code that enables a processor to receive a selection of an operation; and fifth computer readable program code that enables a processor to associate the touch gesture with the selected operation.

Embodiments further include a system for executing a touch gesture. The system includes a touch sensing device and a computing device. The computing device is configured to perform the following functions: receive a touch gesture at the touch sensing device; determine that the touch gesture is not associated with any operations; provide an indication of one or more operations the touch sensing device can perform in response to the touch gesture; receive a selection of an operation; and associate the touch gesture with the selected operation.

Further features and advantages described herein, as well as the structure and operation of various embodiments, are described in detail below with reference to the accompanying drawings. It is noted that the following description is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles herein and to enable a person skilled in the relevant art to make and use the embodiments described herein.

DETAILED DESCRIPTION

The following detailed description refers to the accompanying drawings that illustrate exemplary embodiments. Other embodiments are possible, and modifications can be made to the embodiments within the spirit and scope of the detailed description.

It would be apparent to one of skill in the relevant art that the embodiments, as described below, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 1:
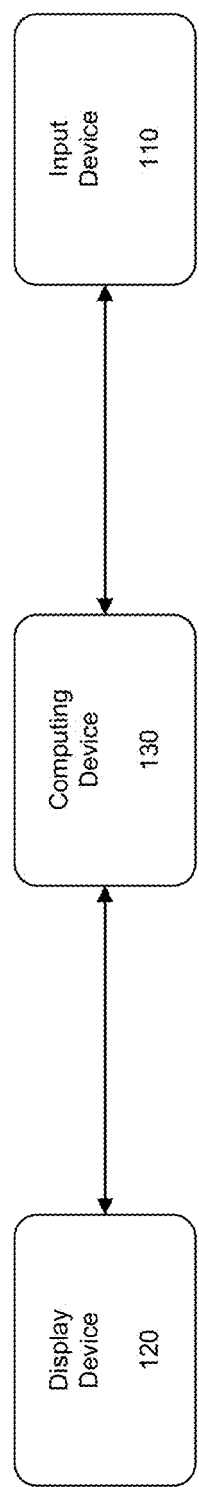
FIG. 1 is an illustration of an exemplary computer system in which embodiments described herein can be implemented.

FIG. 1 is an illustration of an exemplary computer system 100 in which embodiments described herein can be implemented. Computer system 100 can be, for example and without limitation, a personal computer system (e.g., desktop, laptop, tablet, and handheld computers), a personal digital assistant, a mobile device, a consumer electronic device, and other similar types of electronic devices. Computer system 100 includes an input device 110, a display device 120, and a computing device 130.

In an embodiment, computing device 130 is configured to execute instructions and to carry out operations associated with computer system 100. Computing device 130 can control the reception and manipulation of input and output data from input device 110 and display device 120, according to an embodiment. In an embodiment, computing device 130 can be implemented on a single computing device such as, for example and without limitation, a stand-alone device. Examples of computing device 130 include, but are not limited to, a central processing unit, an application-specific integrated circuit, and other types of computing devices that have at least one processor and memory. In another embodiment, computing device 130 can have multiple processors and multiple shared or separate memory components such as, for example and without limitation, one or more computing devices incorporated in a clustered computing environment or a server farm. The computing process performed by the clustered computing environment, or server farm, may be carried out across multiple processors located at the same or different locations.

In reference to FIG. 1, display device 120 is operatively coupled to computing device 130. Display device 120 can be, for example and without limitation, a liquid crystal display, a plasma display, a computer monitor (e.g., a variable graphics array (VGA) display, a super VGA display, and a cathode ray tube display), and other similar types of display devices. In an embodiment, display device 120 can be configured to display a graphical user interface (GUI) that provides an interface between a user and computer system 100 or an application running on computer system 100 (also referred to herein as a "system application"). The system application can be, for example and without limitation, an email application or a video game. Features of the GUI for the system application can be arranged in a predefined layout on display device 120 or can be generated dynamically to serve specific actions taken by the user, according to an embodiment. For instance, the GUI can display information such as interactive text and graphics for the user to select via input device 110.

Input device 110 is also operatively coupled to computing device 130. In an embodiment, the user can make a selection on the GUI for the system application via input device 110. Input device 110 can include a touch sensing device configured to receive an input from a user's touch or a touch gesture from an external touch device (e.g., stylus device) and send the touch information to computing device 130, according to an embodiment. In turn, computing device 130 executes an operation associated with the touch information. The touch sensing device can be, for example and without limitation, a capacitive sensing device, a resistive sensing device, a surface acoustic wave sensing device, a pressure sensing device, an optical sensing device, and other similar types of sensing devices. In one embodiment, input device 110 can be presence sensitive and not require a touch, in addition to or instead of being a touch sensitive device.

In an embodiment, input device 110 can include a touch screen device integrated with a display device 120. The touch screen device can be integrated with display device 120, or it may be a separate component device from display device 120, according to an embodiment. In positioning the touch screen device over or in front of display device 120, the user can manipulate the GUI for the system application via one or more touch gesture (e.g., finger gestures or an external touch device) applied to input device 110. For instance, the user can press a button displayed by the GUI or drag an object in the system application from one end to another end of display device 120 using finger gestures or an external touch device.

In reference to FIG. 1, computer system 100 can be configured to recognize one or more touch gestures applied to input device 110 and to associate the touch gesture with an operation defined by a user, if one has not been defined previously. In an embodiment, computing device 130 can be configured to receive a touch gesture on the input device 110 and display device 120 and, based on the touch gesture, determine that the touch gesture is not associated with any operations. Upon a determination that the touch gesture is not associated with any operations, the computing device 130 can then provide an indication of one or more operations the input device 110 can perform in response to the touch gesture.

For example, a user of the input device 110 can perform a swipe left to right command on the input device 110. The computing device 130 can receive the touch gesture information associated with the left to right swipe and determine that this particular touch gesture is not associated with an operation. The computing device 130 can then provide and display a menu on the display device 120 and input can be received on the input device 110 from a user selecting one of the operations in the menu. The computing device 130 can associate the touch gesture with an operation selected by the user.

A touch gesture can be mapped to a particular feature of the GUI for the system application as determined by a user of the device, according to an embodiment. For instance, in an email application, various touch gestures can be mapped to various features of the application such as, for example and without limitation, a switching between labels function, a switching between folders function, a switching between email accounts function, and other functions associated with the email application. Based on the description herein, a person skilled in the relevant art will recognize that other software applications can include functions determined by users to be mapped to corresponding touch gestures can be used with the embodiments described herein.

Initially, the touch information corresponding to the touch gesture received by input device 110 is transferred to computing device 130. The computing device 130 can make a determination that the touch gesture is not associated with an operation and that this is the first instance of the touch gesture being received within a particular system application. Once this determination is made, the computing device 130 can provide a menu of one or more operations that can be associated with the touch gesture. Once an indication is received of a selected operation, the operation is associated with the touch gesture, and the computing device 1130 can execute the operation associated with the touch command the next time the specific touch gesture is received.

As understood by a person skilled in the relevant art, computing device 130 can execute a touch operation program, or a gesture operation program, that can store a set of instructions that recognizes the occurrence of various touch gestures and informs a system application running on computer system 100 what operations to execute in response to the touch command. Some or all of these gestures can be mapped to operations as determined and set by a user of the device 110.

In one embodiment, the operations are specific to the particular system application that is receiving input at the time of the gesture on the device 110. For example, a user using an email application may indicate using their finger a swipe left to right gesture on the display of the device 110. The computing device 130 can provide a menu of operations specific to the email application if a determination is made that the touch gesture is not associated with an operation. The computing device 130 can provide an indication of one or more operations the touch sensing device can perform in response to the touch gesture. The operations within an email application can include, for example, switching between email applications, switching between email accounts, switching between one or more labels associated with emails in the email application, switching between one or more folders associated with the email application, or to do nothing. Therefore, these operations are specific to the system application, in this example, an email application. In other embodiments, the operations are universal operations that are applicable to all system applications that can be provided on the device 100.

In one embodiment, the touch gestures can include a swipe from left to right on the input device 110, a swipe from right to left on the input device 110, a swipe from left to right on the input device 110, an up swipe on the input device 110 or a down swipe on the input device 110.

Figure 2:
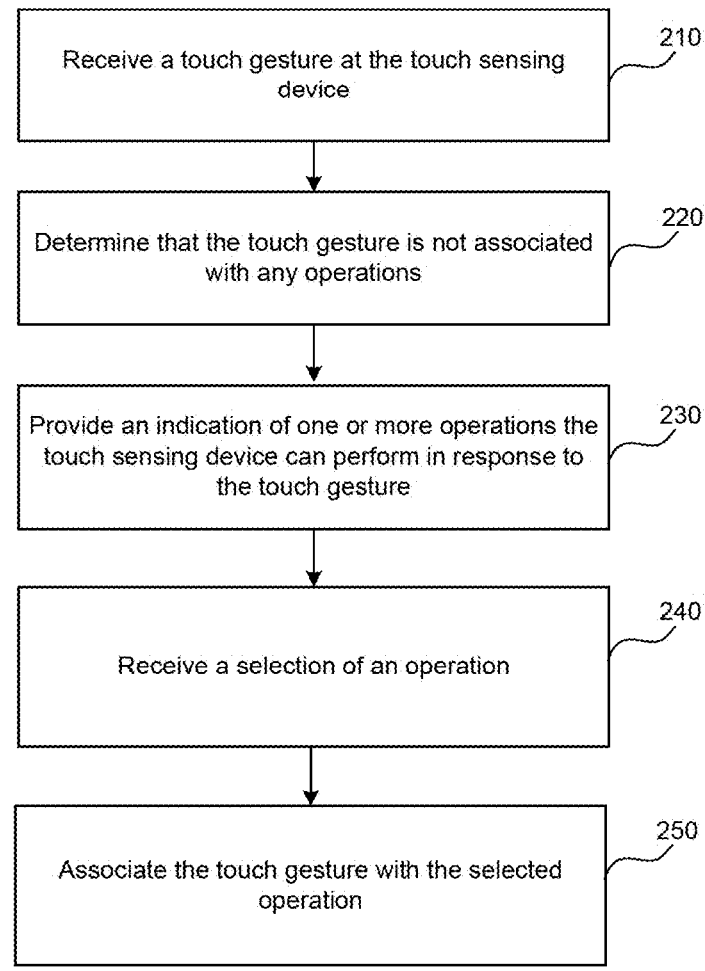
FIG. 2 is an example method of defining a gesture command.

FIG. 2 is an illustration of an embodiment of a method 200 for defining a touch gesture on a touch sensing device. Method 200 can occur using, for example, computer system 100 of FIG. 1 or computer system 400 of FIG. 4 (described in detail below).

Based on the description herein, a person skilled in the relevant art will recognize that method 200 can be executed on other types of computer systems (e.g., computer 400 of FIG. 4) and with other types of input devices. These other types of computer systems and input devices are within the scope and spirit of the embodiments described herein.

Further, for ease of explanation, method 200 will be described in the context of a mobile device with a mobile device user applying a finger touch gesture on a touch screen device of the mobile device. A person skilled in the relevant art will recognize that method 200 can be executed on other types of electronic devices such as, for example and without limitation, a personal digital assistant, a laptop, and other similar types of electronic devices. Further, a person skilled in the relevant art will recognize that the touch screen device of the mobile device can be configured to recognize other sources of the touch gesture such as, for example and without limitation, a stylus device. These other types of electronic devices and sources of the touch gesture are within the scope and spirit of the embodiments described herein.

In an embodiment, an appropriate single-touch gesture is based on a single, touch to the touch screen device (e.g., via the mobile device user's finger). An operation can be mapped to the single-touch gesture and can be executed by a computing device of the mobile device (e.g., computing device 130 of FIG. 1) and displayed on the touch screen device, according to an embodiment.

In step 210, a touch gesture is received at the mobile device. The touch gesture can be detected by the touch screen of the mobile device.

In step 220, a determination can be made that the touch gesture received is not associated with an operation. Therefore, the touch gesture can be determined to be a first instance of the touch gesture received.

In step 230, an indication of one or more operations the touch sensing device can perform in response to the touch gesture is provided. In reference to step 230 of FIG. 2, the computing device can then provide an indication of one or more operations the touch sensing device can perform in response to the touch gesture that allows for a user that performed the touch gesture to define an operation to associate with the touch gesture.

In step 240, a selection of an operation is received. The selection can be a user selecting one of the menu operations. For example, in the email application, a user can select to associate the gesture with scrolling between various labels associated with the emails in the email application, scrolling between different folders associated with the email application, scrolling between different email accounts or applications, or to do nothing.

In step 250, the touch gesture is associated with the selected operation. For example, in the email application, if the selected operation was to scroll between different labels, then the touch gesture is associated with this operation. Therefore, the next time the user of the mobile device performs this operation, emails associated with a first label are displayed to the user.

In the case where the touch gesture is received within an email application, the operations presented can be associated with operations that are continuous. Therefore, if the operation selected is the operation to scroll between labels, the first time the touch gesture is received, the email application loads a first label and associated emails. For example, if the touch gesture is received again, the email application then loads a second label and associated emails. This process continues until there are no more associated labels.

In some cases, the user can select one or more specific labels when selecting an operation of how the mobile device should respond to the touch gesture. The user can specify which labels to show when the touch gesture is performed and which ones not to show. For example, if the user selects the labels "priority inbox," "work," "Betty," and "news," and there are a total of seven other labels, when the touch gestures is received within the email application, the first time the touch gesture is received the emails associated with the label "priority inbox" are displayed. If within this screen the touch gesture is received again, then the emails associated with "Betty" are displayed. Finally if the touch gesture is received again, the emails associated with the label "news" are displayed.

Figure 3B:
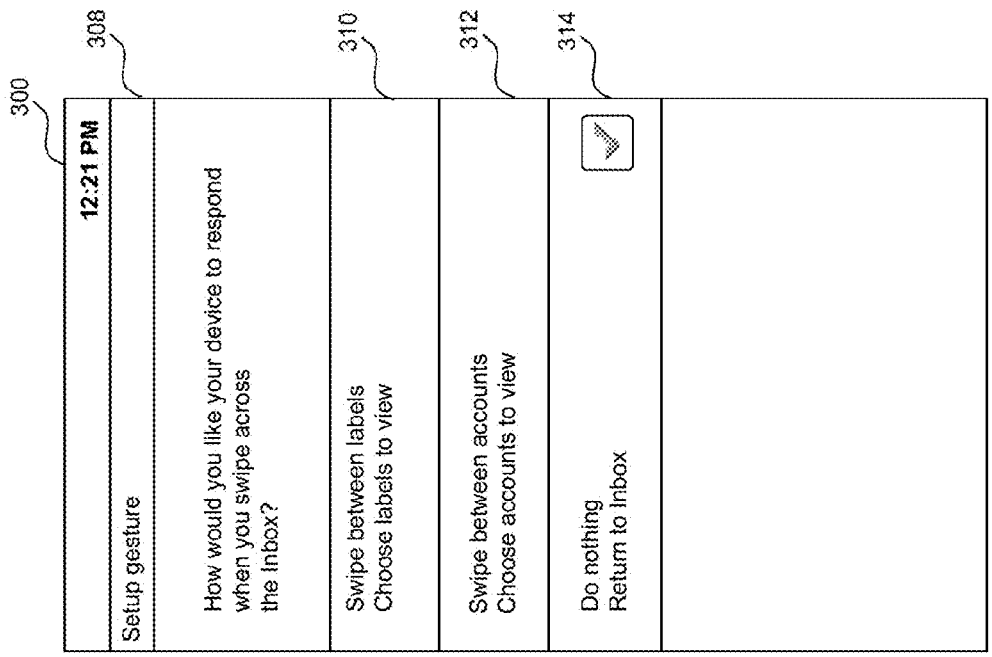
FIGS. 3A-3C are illustrations of exemplary displays on a mobile device in accordance with embodiments.
Figure 3A:
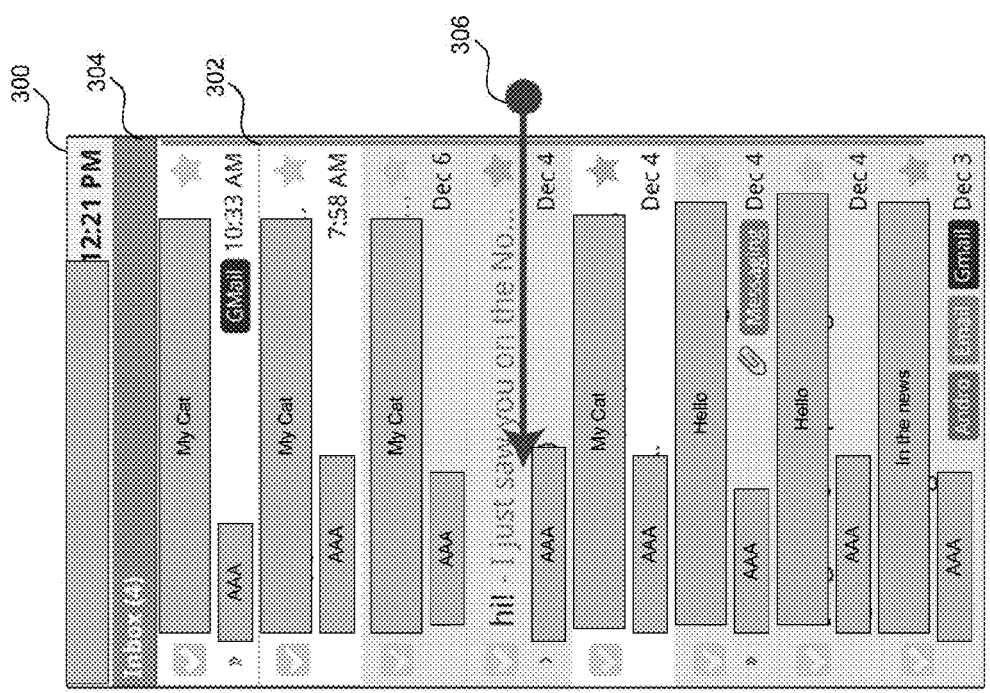
Figure 3C:
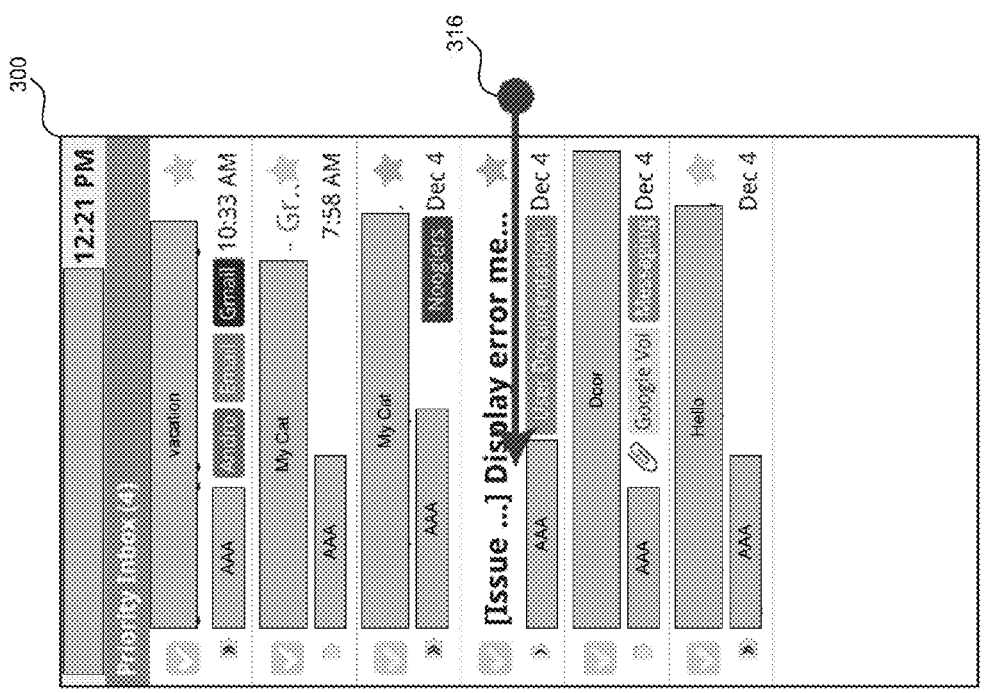

FIGS. 3A, 3B, and 3C are illustrations of a mobile device 300 with an exemplary email application displayed on a touch screen device 302. In this example, the software application is an email application 304.

As shown in FIG. 3A, a user performs a touch gesture, in this example, a horizontal swipe 306 across the screen of the mobile device from right to left. The computing device 130 receives the horizontal swipe 306 from right to left and determines that this touch gesture is not associated with an operation. Upon making this determination, the computing device 130 can provide a menu of operations 308, as shown in FIG. 3B, to be provided on the display device 120. The menu of operations 308 provides a way for the user to define how the device 110 should respond to the particular touch gesture within the software application. In this case, how the email application should respond to the right to left swipe touch gesture.

In some cases, the horizontal swipe 306 is from left to right across the screen of the mobile device. The computing device 130 receives the horizontal swipe 306 from left to right and can also determine that this touch gesture is not associated with an operation. The computing device 130 can provide the menu of operations 308 in the same manner as described above.

The menu 308 shown in FIG. 3B can include an operation 310 to switch between different labels associated with the current email application, an operation 312 to switch between different email accounts, or an operation 314 to do nothing.

In this example, suppose the user of the device 302 selected the operation 310 to switch between different labels associated with the current email application. Therefore, emails that are associated with particular labels will be shown to the user the next time the user performs the touch gesture of the horizontal swipe 306 right to left on the device 302. Emails that are associated with particular labels the user has already viewed will be shown to the user the next time the user performs the touch gesture of the horizontal swipe left to right (now shown) on the device 302.

The touch gesture in this example, the horizontal swipe 306 from right to left, can be mapped to a function to switch between the labels in the email application 304.

In one embodiment, the computing device 130 can determine an opposing gesture to a gesture that has already been associated with an operation. For example, an opposing gesture to a right to left swipe is a left to right swipe. The computing device 130 can then associate with the opposing gesture, an opposing operation associated with the selected gesture. For example, an opposing operation to switch between labels and to go to a next label would be to switch to a previous label.

For example, a horizontal swipe from left to right (not shown), can be mapped to a function to switch between labels as well in the email application 304, however, the left to right swipe can be associated with a function to switch to a previous label, while the horizontal swipe from right to left can be associated with a function to switch to the next label. Based on the description herein, persons skilled in the relevant art will recognize that other operations of the software map application, as well as other software applications, can be mapped to the touch gesture of method 200.

As shown in FIG. 3C, if a movement of the mobile device user's finger is detected and the touch gesture that is detected is one that is associated with an operation, then the operation associated with the touch gesture is executed by the computing device of the mobile device. For instance, if the mobile device user swipes his/her finger horizontally from right to left again after selecting the operation of how the application should respond to the touch gesture, the computing device 130 then performs the selected operation. In this example, as shown in FIG. 3C, the computing device 130 displays a screen 314 displaying emails associated with a first label, in this example the label "priority inbox." The user can then perform another swipe 316 from right to left and the next group of emails associated with a second label can be displayed. When there are no more labels associated with emails, the computing device no longer loads additional views of email messages.

Each time the horizontal swipe 306 from right to left is performed, emails associated with a new label can be displayed. The horizontal swipe from left to right can be associated with a function to display emails associated with a previous label. For example, if a user performs a horizontal swipe from right to left to go to the label "priority inbox," then again to go to a second label, for example, "mom," then if the user at this point performs a horizontal swipe from left to right, the emails associated with the first label "priority inbox" can again be displayed.

In one embodiment, the computing device 130 can receive a indication to disassociate the touch gesture from the selected operation. The user may be able to make this disassociation within a menu provided on the mobile device. The user can indicate that he/she no longer wants a particular gesture associated with an operation. The computing device 130 can then disassociate the touch gesture with the selected operation. The user can then select a new operation to associate with the touch gesture. The computing device 130 can receive a selection of a new operation, and then associate the touch gesture with the selected new operation.

Figure 4:
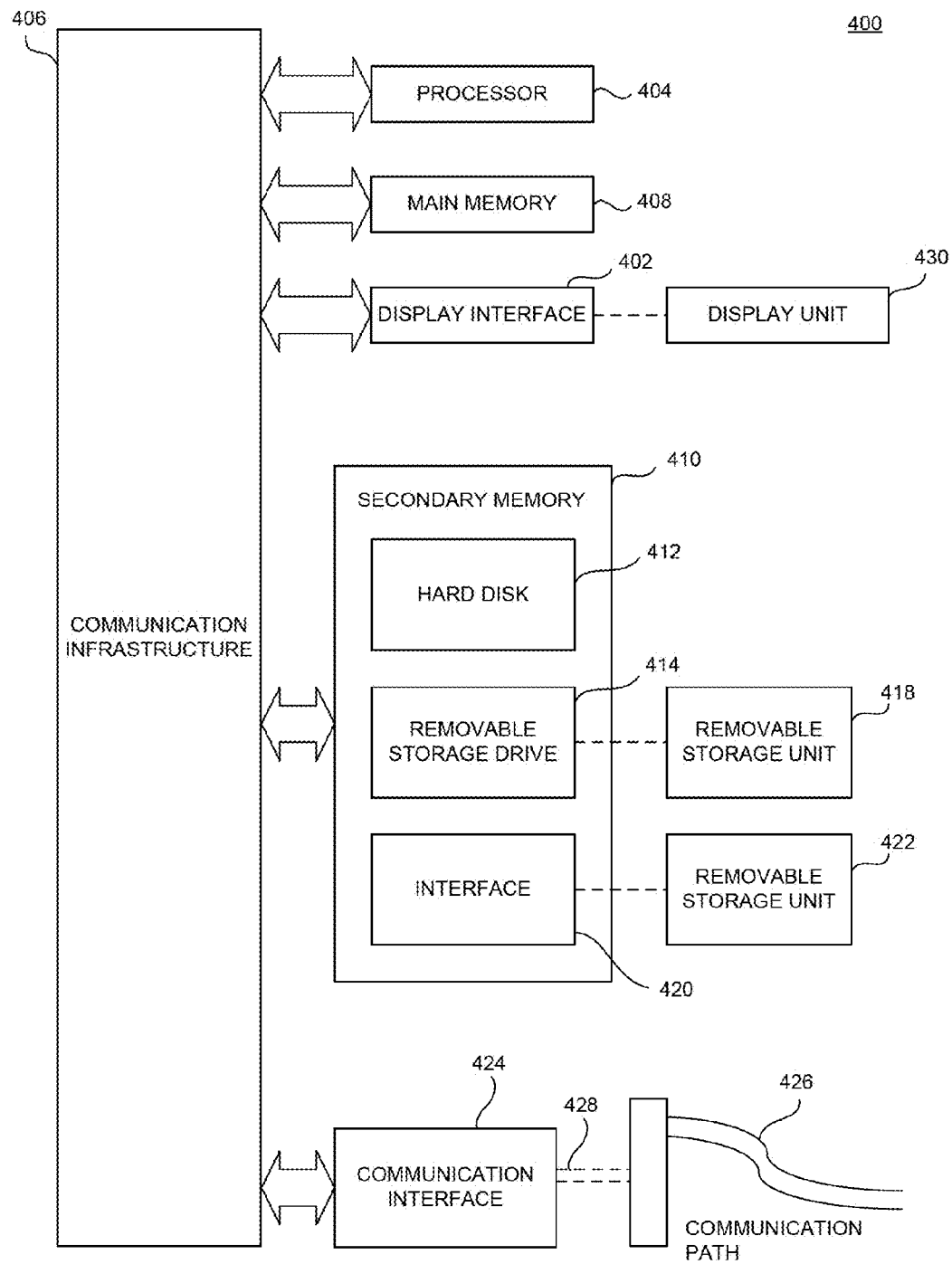
FIG. 4 is an illustration of an example computer system in which embodiments can be implemented.

Various aspects of the embodiments described herein may be implemented in software, firmware, hardware, or a combination thereof. FIG. 4 is an illustration of another example computer system 400 in which embodiments described herein, or portions thereof, can be implemented as computer-readable code. For example, the methods illustrated by flowchart 200 of FIG. 2 can be implemented in computer system 400. Various embodiments are described in terms of this example computer system 400. After reading this description, it will become apparent to a person skilled in the relevant art how to implement embodiments described herein using other computer systems and/or computer architectures (e.g., computer system 100 of FIG. 1).

Computer system 400 includes one or more processors, such as processor 404. Processor 404 may be a special purpose or a general-purpose processor. Processor 404 is connected to a communication infrastructure 406 (e.g., a bus or network).

Computer system 400 also includes a main memory 408, random access memory (RAM), and may also include a secondary memory 410. Secondary memory 410 can include, for example, a hard disk drive 412, a removable storage drive 414, and/or a memory stick. Removable storage drive 414 can comprise a floppy disk drive, a magnetic tape drive, an optical disk drive, a flash memory, or the like. The removable storage drive 414 reads from and/or writes to a removable storage unit 418 in a well-known manner. Removable storage unit 418 can include a floppy disk, magnetic tape, optical disk, etc. which is read by and written to by removable storage drive 414. As will be appreciated by persons skilled in the relevant art, removable storage unit 418 includes a computer-usable storage medium having stored therein computer software and/or data.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

In alternative implementations, secondary memory 410 can include other similar devices for allowing computer programs or other instructions to be loaded into computer system 400. Such devices can include, for example, a removable storage unit 422 and an interface 420. Examples of such devices can include a program cartridge and cartridge interface (such as those found in video game devices), a removable memory chip (e.g., EPROM or PROM) and associated socket, and other removable storage units 422 and interfaces 420 which allow software and data to be transferred from the removable storage unit 422 to computer system 400.

Computer system 400 can also include a communications interface 424. Communications interface 424 allows software and data to be transferred between computer system 400 and external devices. Communications interface 424 can include a modem, a network interface (such as an Ethernet card), a communications port, a PCMCIA slot and card, or the like. Software and data transferred via communications interface 424 are in the form of signals, which may be electronic, electromagnetic, optical, or other signals capable of being received by communications interface 424. These signals are provided 428 to communications interface 424 via a communications path 426. Communications path 426 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 418, removable storage unit 422, and a hard disk installed in hard disk drive 412. Computer program medium and computer-usable medium can also refer to memories, such as main memory 408 and secondary memory 410, which can be memory semiconductors (e.g., DRAMs, etc.). These computer program products provide software to computer system 400.

Computer programs (also called computer control logic) are stored in main memory 408 and/or secondary memory 410. Computer programs may also be received via communications interface 424. Such computer programs, when executed, enable computer system 400 to implement embodiments described herein. In particular, the computer programs, when executed, enable processor 404 to implement processes described herein, such as the steps in the methods illustrated by flowchart 200 of FIG. 2, discussed above. Accordingly, such computer programs represent controllers of the computer system 400. Where embodiments are implemented using software, the software can be stored in a computer program product and loaded into computer system 400 using removable storage drive 414, interface 420, hard drive 412 or communications interface 424.

Based on the description herein, a person skilled in the relevant art will recognize that the computer programs, when executed, can enable one or more processors to implement processes described above, such as the steps in the method illustrated by flowchart 200 of FIG. 2. In an embodiment, the one or more processors can be part of a computing device incorporated in a clustered computing environment or server farm. Further, in an embodiment, the computing process performed by the clustered computing environment such as, for example, the steps in the method illustrated by flowchart 200 may be carried out across multiple processors located at the same or different locations.

Based on the description herein, a person skilled in the relevant art will recognize that the computer programs, when executed, can enable multiple processors to implement processes described above, such as the steps in the method illustrated by flowchart 200 of FIG. 2. In an embodiment, the computing process performed by the multiple processors can be carried out across multiple processors located at a different location from one another.

Embodiments are also directed to computer program products including software stored on any computer-usable medium. Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments have been described above, it should be understood that they have been presented by way of example only, and not limitation. It will be understood by those skilled in the relevant art that various changes in form and details can be made therein without departing from the spirit and scope of the embodiments described herein. It should be understood that this description is not limited to these examples. This description is applicable to any elements operating as described herein. Accordingly, the breadth and scope of this description should not be limited by any of the above-described exemplary embodiments, but should be defined only in accordance with the following claims and their equivalents.

What is claimed is:

1. A method, comprising:
receiving, at a computing device, an indication of a first touch gesture, the first touch gesture entered at a touch sensing device operatively coupled to the computing device;
responsive to determining, by the computing device, that the first touch gesture is not associated with any operations of an application stored at the computing device, determining one or more operations that can be performed by the application and outputting, for display at a display device, a menu indicating of the one or more operations that can be performed by the application;
responsive to receiving, at the computing device, an indication of a selection of a first operation of the one or more operations, associating the first touch gesture with the first operation; and
responsive to receiving, at the computing device, an indication of a selection to associate a second operation of the one or more operations with the first touch gesture, associating the first touch gesture with the second operation and disassociating the first touch gesture from the first operation.

2. The method of claim 1, further comprising performing, by the computing device, the first operation.

3. The method of claim 1, wherein the one or more operations include at least one of switching between one or more email accounts, switching between one or more labels associated with one of the one or more email accounts, switching between one or more folders associated with one of the one or more email accounts, and taking no action.

4. The method of claim 2, wherein performing the first operation comprises:
hiding, from display at the display device, a first email account; and
outputting, for display at the display device, a second email account.

5. A non-transitory computer-readable medium having instructions stored thereon that, when executed by one or more processors, cause a computing device to:
receive an indication of a first touch gesture, the first touch gesture entered at a touch sensing device operatively coupled to the computing device;
responsive to determining that the first touch gesture is not associated with any operations of an application stored at the computing device, determine one or more operations that can be performed by the application and output, for display at a display device, a menu indicating the one or more operations that can be performed by the application;
responsive to receiving an indication of a selection of a first operation of the one or more operations, associate the first touch gesture with the first operation; and received at the touch sensing device; and
responsive to receiving an indication of a selection to associate a second operation of the one or more operations with the first touch gesture, associate the first touch gesture with the second operation and disassociate the first touch gesture from the first operation.

6. The computer-readable medium of claim 4, wherein the instructions, when executed by the one or more processors, further cause the computing device to perform the first operation associated with the first touch gesture.

7. The computer-readable medium of claim 4, wherein the one or more operations include at least one of switching between one or more email accounts, switching between one or more labels associated with one of the one or more email account, switching between one or more folders associated with one of the one or more email accounts, and taking no action.

8. The computer-readable medium of claim 5, wherein performing the first operation associated with the first touch gesture includes outputting, for display at the display device, one or more emails associated with a label of an email account.

9. A system, comprising:
a display device;
a touch sensing device; and a computing device operatively coupled to the display device and the touch sensing device, wherein the computing device is configured to:

receive an indication of a first touch gesture, the first touch gesture entered at the touch sensing device;

responsive to determining that the first touch gesture is not associated with any operations of an application stored at the computing device, determine one or more operations that can be performed by the application and output, for display at the display device, a menu indicating the one or more operations that can be performed by the application;

responsive to receiving an indication of a selection of a first operation of the one or more operations received at the touch sensing device, associate the first touch gesture with the first operation; and responsive to receiving an indication of a selection to associate a second operation of the one or more operations with the first touch gesture, associate the first touch gesture with the second operation and disassociate the first touch gesture from the first operation.

10. The system of claim 8, wherein the computing device is further configured to perform the first operation.

11. The system of claim 8, wherein the one or more operations include at least one of switching between one or more email accounts, switching between one or more labels associated with one of the one or more email accounts, switching between one or more folders associated with one of the one or more email accounts, and taking no action.

12. The system of claim 9, wherein performing the first operation includes outputting, for display at the display device, one or more emails associated with a folder associated with an email account.

* * * * *